US005271308A

United States Patent [19]

Balog

[11] Patent Number: 5,271,308

[45] Date of Patent: Dec. 21, 1993

[54] SOFT ATTACK GUITAR PICK

[75] Inventor: Kent Balog, P.O. Box 156, Clifton, Colo. 81520

[73] Assignee: Kent Balog, Clifton, Colo.

[21] Appl. No.: 894,005

[22] Filed: May 26, 1992

[51] Int. Cl.[5] ............ G01D 3/16

[52] U.S. Cl. ............ 84/322

[58] Field of Search ............ 84/320, 322, 328

[56] References Cited

U.S. PATENT DOCUMENTS

| | | | |
|---|---|---|---|
| 317,171 | 5/1891 | Saks | 84/322 X |
| 4,120,227 | 10/1978 | Bola os | 84/320 |
| 4,993,302 | 6/1989 | Jonathan | 84/322 |

*Primary Examiner*—Michael L. Gellner
*Assistant Examiner*—P. J. Stanzione

[57] ABSTRACT

The Soft Attack guitar and bass pick includes hard plastic guitar pick and hard felt bonded by silicone glue. The Soft Attack pick helps produce better picking techniques, an easier grip, and different musical tones.

1 Claim, 1 Drawing Sheet

SOFT ATTACK GUITAR PICK

BACKGROUND OF THE INVENTION

1. Field of the Invention

The subject invention pertains to better guitar and bass guitar picking technique.

2. Description of Related Art

Current guitar picks are made of hard plastic which makes the notes sharp and crisp.

However, when fingers become wet with perspiration, it is hard to maintain a grip on the plastic pick.

SUMMARY OF THE INVENTION

The Soft Attack Pick combines the hard plastic for sharp crisp sound with hard felt which produces a soft mellow sound.

The soft felt also contributes to: easier grip and better finger support; absorption of moisture: and better picking techniques.

or with one of the rounded edges showing for playing bass guitars.

The finger gripping area of the hard felt is sanded down to prevent a ridge on the pick.

DESCRIPTION OF THE PREFERRED EMBODIMENTS

Figure 1:
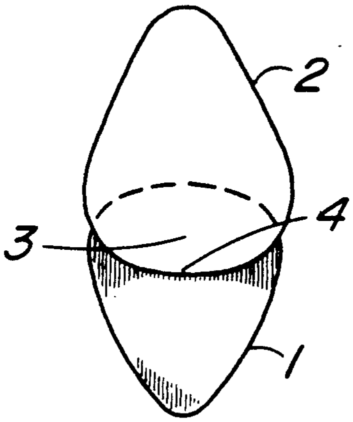
FIG. 1 illustrates a hard plastic triangular pick with two rounded and one pointed edge.
Figure 2:
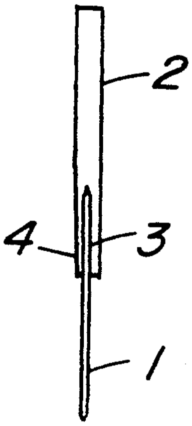
FIG. 2 illustrates a hard triangular felt pick with two rounded and one pointed edge.

Referring to FIG. 1, a hard plastic pick is inserted into FIG. 2 (hard felt) with either pointed or rounded edge out. Bond together with silicone bonding agent.

Figure 3:
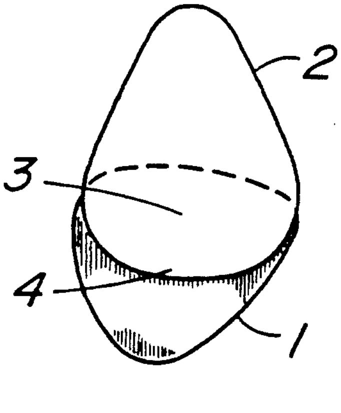
FIG. 3 illustrates the Soft Attack Pick in which the hard plastic pick is inserted halfway into the hard felt with the pointed hard edge showing for playing guitars.

Referring to FIG. 3, sand ridge of hard felt until felt and plastic are even.

I claim:

1. A more versatile guitar and bass guitar pick which is easier to grip and produces different tones, said guitar pick comprises:

a first member consisting of a piece of hard oblong shaped plastic with a narrow end and a wide end;

a second member consisting of a piece of hard oblong shaped felt with a narrow end and a wide end;

wherein said hard plastic member is bonded to said hard felt member with a silicone adhesive such that the narrow end of both said oblong members face away from each other at a 180 degree angle, both said oblong members partially overlapping, the narrow end of each said oblong member extending beyond said wide end of the other member, said wide end of said felt member being sanded down to prevent a ridge on said pick.

* * * * *